FIG. 1

Nov. 23, 1971   W. A. GERRANS   3,621,643
SOFT FRUIT HARVESTER

Filed Feb. 3, 1969   6 Sheets-Sheet 4

INVENTOR.
WILLIAM A. GERRANS
BY
PATENT AGENT

Nov. 23, 1971 W. A. GERRANS 3,621,643
SOFT FRUIT HARVESTER

Filed Feb. 3, 1969 6 Sheets-Sheet 6

INVENTOR.
WILLIAM A. GERRANS
BY
PATENT AGENT

United States Patent Office 3,621,643
Patented Nov. 23, 1971

3,621,643
SOFT FRUIT HARVESTER
William A. Gerrans, 15 Florimond Drive,
Colusa, Calif. 95932
Filed Feb. 3, 1969, Ser. No. 795,821
Int. Cl. A01g 19/08
U.S. Cl. 56—329
15 Claims

ABSTRACT OF THE DISCLOSURE

A harvester for peaches or other soft fruits which includes a fruit-catching draper conveyor with fruit-decelerating means thereover supported between two steerable wheel trucks, one of which carries a movable tree shaker, the fruits dislodged by the shaker and dropping onto the draper conveyor being movable away from the tree for subsequent conveyance and deposit in a fruit bin.

---

The present invention relates generally to the harvesting of tree-grown fruits and nuts and, more particularly, to a harvester for soft fruits, such as peaches, which are readily damaged by any impact experienced, for example, as the fruit falls from the tree.

BACKGROUND OF THE INVENTION

During the past 10 years, mechanical harvesting of fruits and nuts has become increasingly common, at least in part, because of the scarcity of manual labor for picking of the fruit. In fact, a large number of harvesting machines, such as shown in my prior U.S. Pat. No. 3,248,865, entitled, "Fruit and Nut Harvester," are now extensively used in the harvesting of walnuts, prunes, apricots, and many additional tree-grown fruits and nuts. However, such equipment is somewhat unsatisfactory in the harvesting of certain "soft fruits," such as peaches and apples, which are quite easily damaged by impact, either with the harvesting structure or, alternatively, with one another. The term "soft fruit," as employed herein, is intended to encompass any product which is susceptible to damage through such impact.

A careful analysis of any harvesting operation indicates that damaging impact can occur not only as the fruit drops from the tree onto the harvester structure or onto another piece of fruit but also, since it is obviously necessary that the fallen fruits must be conducted in some fashion through a suitable conveyor means for ultimate deposit in a receiving bin, during such fruit transfer additional occasions for impact arise, either between the individual fruits or with structural elements of the harvester or the bottom of the receiving bin. As a consequence, although certain attempts have been made to produce harvesters capable of handling "soft fruit," all known harvesters at the present time have, in one fashion or another, presented sufficient impact problems that no more than a 70% recovery of high grade unbruised fruit has been achieved.

As a corollary to the impact problems encountered in existing harvesters, the obvious need for extremely gentle handling of the fruits during the entire harvesting operation has seemingly necessitated a slow harvesting rate. By way of example, peaches must be removed from a given area before additional peaches can be dropped thereover to avoid the damaging fruit-to-fruit contact.

Thus, in summary, existing mechanical harvesters for "soft fruits," such as peaches, have been extremely slow in their operation and have produced a relatively high percentage of damage to the harvested fruit, ranging from 30% damage upwardly.

SUMMARY OF THE PRESENT INVENTION

Consequently, it is the general objective of the present invention to provide a soft fruit harvester normally operable in the form of two units which can be quickly placed in substantial mirror symmetry on opposite sides of a fruit tree whereupon the fruit may be dislodged from the tree by a tree-shaking operation to drop onto the fruit-catching portion of the unit for subsequent delivery to a fruit-receiving bin or other receptacle in an expeditious manner which, however, precludes any damaging impact to the fruits throughout the entire operation so that a recovery of high grade fruits in excess of 95% is achieved.

To achieve this objective, each of the harvester units generally includes an elongated main frame that is cradled between wheel trucks at its opposite extremities so that such frame can be supported at a very low level immediately above the ground. Both of the wheel trucks are arranged for steering to facilitate maneuverability of the entire unit and at least one wheel truck is powered from a suitable engine so that the entire unit can be self-propelled.

Preferably, one of the wheel trucks is joined pivotally to one extremity of the elongated frame about an axis extending generally longitudinally between the two wheel trucks, thus to avoid undesired application of twisting torque to the frame when the spaced wheel trucks encounter uneven ground. In addition, the pivotal connection is made to facilitate ease of separation so that the one wheel truck can be detached and operated as an independent unit when desired and as will be described in detail hereinafter.

The detachable wheel truck preferably mounts a tree limb-shaking mechanism of the type disclosed in my referred-to U.S. Pat. No. 3,248,864, and thus, when disconnected, this wheel truck unit can function as an independent tree shaking mechanism. While such tree limb-shaking mechanism obviously is applied to the limbs of a tree, if the particular type of tree and fruit permits, a trunk-shaking mechanism can be substituted therefor in accordance with another aspect of the present invention, and such trunk-shaking mechanism is preferably mounted centrally of the elongated frame to facilitate its operative connection with the trunk portion of a tree.

On the main elongated frame between the wheel trucks at its extremities, a sloping draper conveyor is supported to receive fruit dropped from the tree for subsequent conveyance in a wide path extending generally transversely relative to the longitudinal disposition of the entire harvester along an upwardly inclined path enabling subsequent transfer to a receiving bin or other receptacle. The entire draper conveyor is mounted for lateral shifting movement on the frame along a downwardly inclined path into adjacent relationship with the trunk of the tree at its central portion and because of the low level of the supporting frame, such contact with the tree can be made at a very low level immediately above the ground, thus to enable accommodation to trees whose limbs start branching from the trunk at heights no more than 2 feet above the ground. Since it is obvious that the draper conveyor cannot itself directly contact the tree, a small sloping wing structure is mounted adjacent the lower edge of the conveyor and is provided with a central resilient tree-seal section enabling close engagement with the tree, ultimately then to provide a fruit-catching structure capable of catching and retaining all dislodged fruits.

So that the dislodged fruits are not injured by contact with the wing structure or the mentioned draper conveyor, fruit deceleration means, preferably in the form of a number or superimposed layers of parallel ribbons, are supported over both structures so as to impede the descent of the fruits prior to their ultimate contact with the wing or conveyor. The decelerating ribbons are supported from a resilient member so that they may give when contacted by the falling fruits but, on the other hand, the resilience is achieved in a manner wherein the resilient recovery of the ribbons to their initial positions is dampened wherefore an individual fruit will not be thrown upwardly into damaging contact with another fruit falling thereagainst. Thus, the fruits are decelerated and are, in effect, placed softly onto the wing and the draper conveyor for further transport.

Adjacent the upper discharge end of the inclined draper conveyor, a pair of laterally extending conveyors can be placed so that the discharged fruits may be dropped thereon in a controlled fashion through the use of additional decelerating ribbons. The two conveyors move the fruit inwardly towards the longitudinal center of the elongated frame so that all fruits are thereafter dropped onto another conveyor at a controlled rate. This conveyor incorporates a sizing mechanism which discharges undersized fruits onto the ground whereas the desired larger fruits are delivered to an elevator supported on one of the wheel trucks at the end of the unit to deliver the fruits upwardly for subsequent discharge into a receiving bin suitably supported by a platform on such wheel truck.

The discharge of fruits into the receiving bin can also be decelerated through the expedient of additional decelerating ribbons or, as an alternative, the receiving bin can be mechanically supported for an upward tipping motion so that the fruits may be gently deposited along one one side of the bin initially and will thereafter move slowly under slight gravitational forces to the bottom. As and bin-filling operations can continue, without interruption so that during the entire bin loading operation, no substantial drop of the fruits is encountered, thus to preclude fruit damage.

After all fruit has been displodged from a single tree, the draper conveyor and attached tree-engaging wing can be laterally withdrawn to enable subsequent movement of the entire unit to the next tree. However, the conveying and bin-filling operations can continue, without interruption, during the movement so as to expedite the entire harvesting process.

The invention, as generally described, can be modified in many of its details while preserving the careful albeit rapid handling of the harvesting operatin. By way of example, the draper conveyor can be arranged to discharge its load into a water trough which decelerates fruit descent and thus prevents damage to the discharged fruits. In turn, conveyance of the fruits can be achieved through appropriate pumping of the water longitudinally of the trough toward a suitable receiving elevator.

As yet another alternative, the frame structure can be somewhat revised so that the draper conveyor discharges the fruit directly into mobile bins supported for intermittent motion on a conveyor supported on the frame or by separate and independent wheeled carts or gondolas which, when filled, can be taken to a suitable processing station.

BRIEF DESCRIPTION OF THE DRAWINGS

The stated objective of the invention and the details of the summarized structure for achieving such objective will be more readily understood by reference to the following detailed description of the exemplary structures shown in the accompanying drawings wherein.

DETAILED DESCRIPTION OF THE EXEMPLARY EMBODIMENTS OF THE INVENTION

Figure 1:
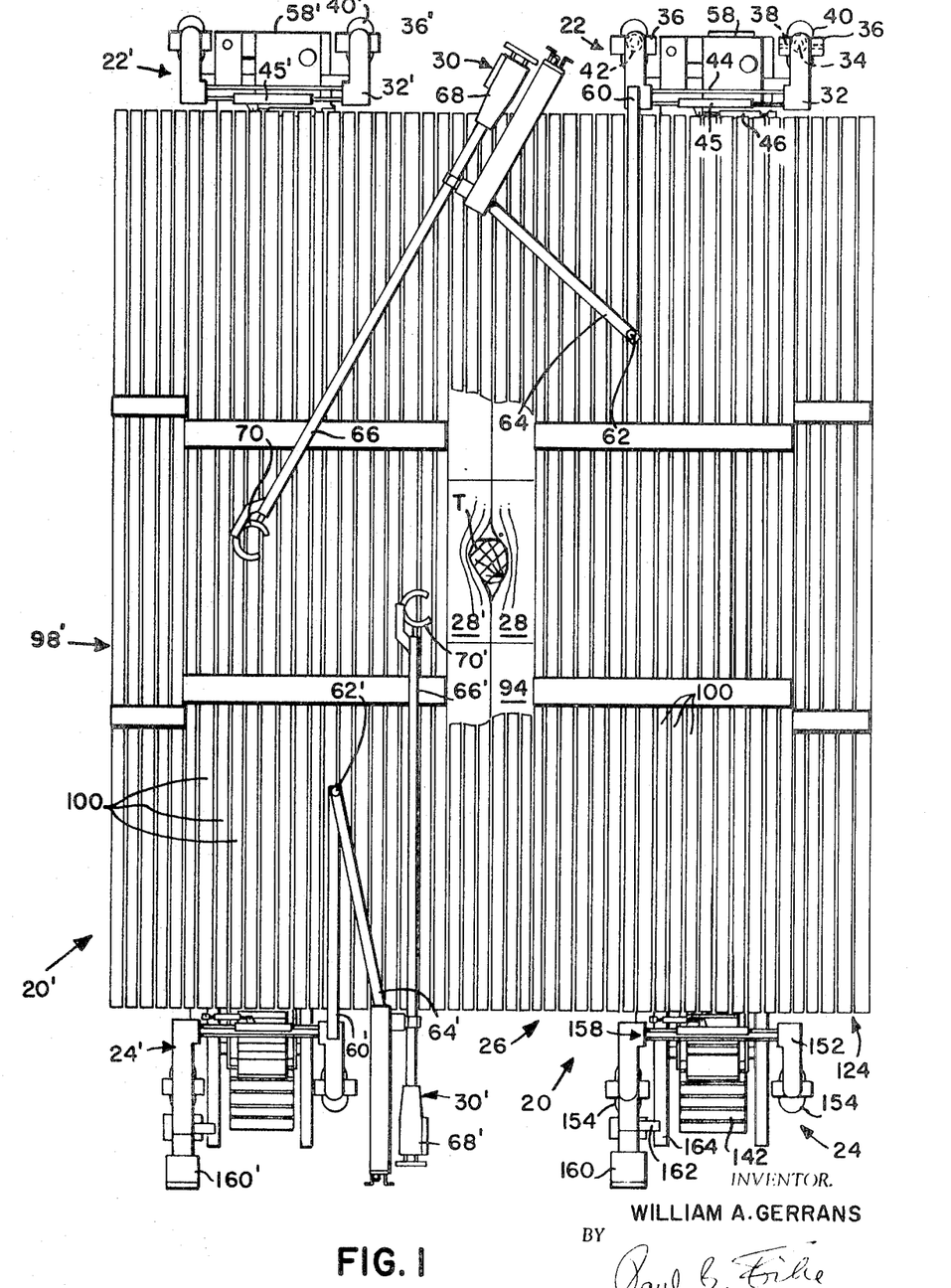
FIG. 1 is a top plan view of a pair of harvester units embodying the present invention disposed in operative harvesting position on opposite sides of a peach tree.
Figure 2:
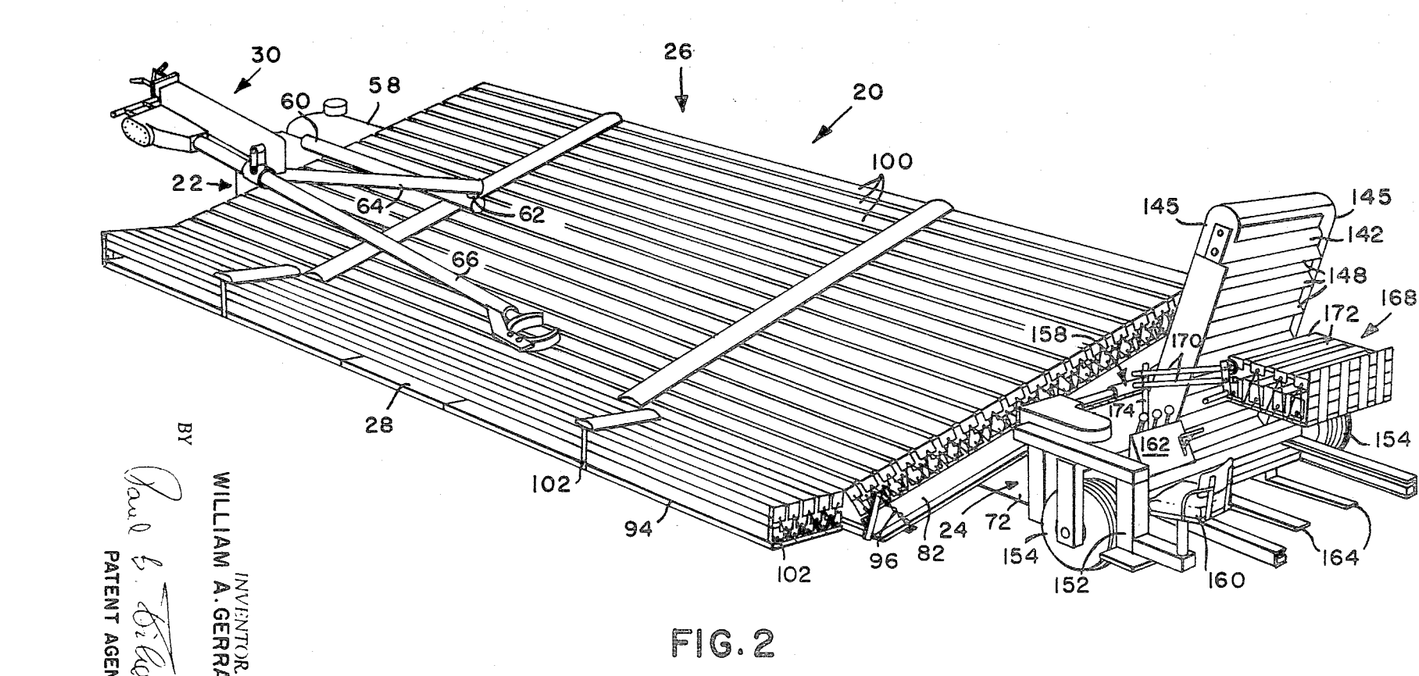
FIG. 2 is a perspective view of the right-hand harvester unit of FIG. 1.

With initial reference to FIG. 1, a pair of harvester units 20, 20' are shown in harvesting positions on opposite sides of the trunk of a peach tree T. Since the units are quite similar, corresponding parts thereof are indicated by like numerals and are differentiated only by the addition of a prime notation.

As shown in FIG. 1, each of the harvester units 20, 20' is of generally elongated rectangular configuration including mobile supporting wheel trucks 22, 24 and 22', 24' at its opposite longitudinal extremities with the fruit-catching and conveying portion 26 of the unit cradled entirely therebetween for receiving fruits dropped from one half of the tree, the opposite unit obviously receiving fruits discharged from the opposite half of the tree. In practice, the catching and conveying portion 26 of each unit is approximately 25 feet in length and approximately 12 feet in width so as to be capable of receiving all fruits from a full-grown peach tree T as found in a typical orchard.

As is generally illustrated in FIG. 1 and as will be described in more detail hereinafter, the fruit-catching portion 26 of each harvester unit 20, 20' includes a central resilient section 28, 28' which is arranged to tightly engage the trunk of the tree immediately above the ground so as to establish a tree seal which precludes the dropping of any fruit directly on the ground. In addition, because of this resilient sealing engagement, the adjacent edges of other portions of the two harvester units 20, 20' can be brought into close abutting relationship to provide an uninterrupted catching surface to assure full recovery of all fruits dislodged from the tree.

As is well-known, orchard trees are arranged in rectilinear rows and the two harvester units 20, 20' shown in FIG. 1 are arranged, after the harvesting operation on one tree has been completed, to move forwardly in parallel relationship to the next tree, such forward motion in FIG. 1 being toward the top of the sheet.

In order to dislodge the fruits from the tree onto the harvester units 20, 20' in harvesting position, as illustrated in FIG. 1, a limb-shaking unit 30, preferably of the type disclosed in my prior U.S. Pat. No. 3,248,865, is mounted on the wheel truck 22 at the forward end of the right-hand harvester unit 20, as viewed in FIG. 1, and a similar limb-shaking unit 30' is mounted on the wheel truck 24' at the rearward end of the left-hand harvester unit 20'. This physical disposition of the limb-shaking units 30, 30' on the two harvester units 20, 20' facilitates access of the shaking units to all limbs of the tree wherefore dislodging of all fruits is enabled.

In all other respects, the two harvester units 20, 20' are substantially identical, being arranged in substantial mirror symmetry on opposite sides of the tree T and, accordingly, only one unit 20, that on the right in the FIG. 1, will be described in detail with specific additional reference to FIGS. 2 through 6, inclusive, of the drawings. The wheel truck 22 shown at the top of the right-hand harvester unit 20 in FIG. 1 which mounts the limb shaking unit 30 includes a generally open rectangular frame 32 which at each side rotatably supports an upright pivot pin 34 rigidly secured at its lower end to a wheel mounting bracket 36 of inverted U-shaped configuration. An axle 38 is arranged in bridging relationship across the open lower end of the U-shaped bracket 36 and mounts a wheel 40 preferably with a pneumatic tire thereon. The upper end of each pivot pin 34 carries a sprocket 42 about which a sprocket chain 44 is trained and thereafter is interconnected by a rigid insert 45 to one end of a hydraulic ram 46 whose opposite end is connected to the frame 32. Extension or retraction of the ram will effect correlated pivotal steering of both wheel-mounting brackets 36 and the wheels 40 supported therefrom.

Figure 3:
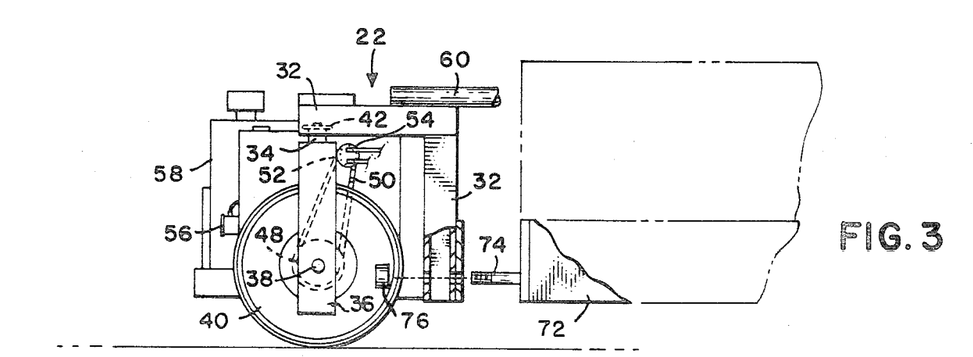
FIG. 3 is a fragmentary enlarged side elevational view of a supporting wheel truck at one end of the harvester structure and indicating its manner of detachment from the harvester frame.

To effect propulsion of the entire harvester unit 20, a sprocket 48 is mounted on each of the wheel axles 38 for interconnection by a suitable endless sprocket chain 50 to a smaller sprocket 52 on a hydraulic motor 54 mounted on the pivoted wheel mounting bracket 36, as best shown in FIG. 3. Each hydralic motor 54 is, in turn, supplied with hydraulic fluid which passes through flexible conduits (not shown) from a suitable hydraulic pump 56. The hydraulic pump 56, in turn, is driven by a suitable internal combustion engine 58 rigidly mounted on the wheel truck frame 32, and in view of the fact that the pump 56 also supplies hydraulic energization to the steering ram 46 previously described and other hydraulic mechanisms to be hereinafter described, an internal combustion engine of approximately 75 HP is required.

The wheel truck frame 32, as mentioned carries the limb-shaking unit 30 which includes an arm 60 that projects horizontally over the fruit catching portion 26 of the harvester for a distance of some six feet. The arm 60 carries an upright pivot 62 for pivotal support of a second generally horizontal arm 64 which supports, at its free extremity, a boom 66 for limited reciprocating motion under actuation by an inertia shaking mechanism 68 at one end thereof, the other end of the boom 66 mounting a tree clamp 70 arranged under hydraulic actuation to establish clamping engagement with a selected limb of the tree. Preferably, the briefly described limb shaking unit 30 is constructed in a manner similar to that shown specifically in FIG. 6 of my aforementioned U.S. Pat. No. 3,248,865, to which reference is made for details of such construction.

As best shown in FIG. 3, interconnection between the described wheel truck 22 and the main longitudinally-extending harvester frame 72 is made through the expedient of a large pivot pin 74 which projects substantially horizontally from the end of the frame 72 for reception in a socket in the lower central portion of the wheel truck frame 32. A suitable cap 76 is secured over the pivot pin 74 to integrate the wheel truck 22 with the harvester frame 72 longitudinally but to permit relative pivotal displacement on the two members wherefore the wheel truck can vary in its cross-slope disposition if uneven ground is encountered but the elongated main frame 72 of the harvester will be retained in its existent disposition as controlled primarily by its rigid connection to the wheel truck 24 at the opposite end. Accordingly, if the one wheel truck is resting on ground having a different cross-slope than the other, the two wheel trucks 22, 24 can accommodate themselves to such different cross-slope disposition of the ground without imparting a twisting torque to the main harvester frame 72.

Removal of the cap 76 from the pivot pin 74 from the socket allows the wheel truck 22, as shown in FIG. 3, to be entirely disconnected from the harvester frame 72 and a third wheel (not shown) can be mounted from the socket to provide a tricycle mobile support for this wheel truck as an independent unit. After the hydraulic connections to the harvester frame 72 have been disconnected, the wheel truck 22 can be operated as an independent unit for shaking operations and can, for the matter, be used to supply hydraulic energization to other accessories, such as a hydraulic pruning shears, for example, of the type illustrated in my previous U.S. Pat. No. 2,814,872. In this fashion, the utility of this wheel truck structure is greatly extended.

Figure 5:
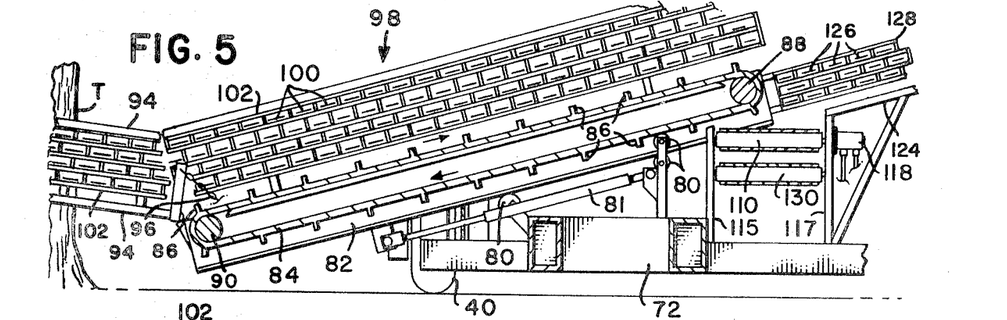
FIG. 5 is a transverse cross-sectional view taken substantially along lines 5—5 of FIG. 4 and illustrating the relationship of the fruit-catching and conveying portions of the unit.

The mentioned elongated frame 72 is pivotally connected, as described above, to the one wheel truck 22, as shown in FIG. 3, at a relatively low disposition and is rigidly connected to the wheel truck 24 at its opposite end so that the entire elongated frame, which can simply consist of two elongated frame members connected by transverse braces at spaced longitudinal positions, is disposed at a relatively low level immediately above the ground, as can best be visualized by reference to FIG. 5. Such low profile of the elongated main frame 72 can be accomplished since all large elements of the harvester unit, such as the engine 58, are mounted on the wheel trucks 22, 24 at the ends.

On each of the transverse braces of the elongated main frame 72, a pair of rollers 80 are mounted at different levels to movably support an inclined draper conveyor frame 82 for movement on the rollers 80 in response to extension or retraction of a hydraulic ram 81, which, as shown in FIG. 5, is connected between the elongated main fame 72 at one extremity and the conveyor frame 82 at its opposite end. The draper conveyor frame 82, in turn, supports three parallel draper conveyors 84, each of which is in the form of an endless conveyor structure, preferably formed by canvas or other flexible materal, having a plurality of transverse resilient ribs 86 extending across its surface. Each of the draper conveyors 84 is trained about elongated rollers 88, 90 rotatably supported by inclined elements of the draper conveyor frame 82 which also form the side walls of the conveyors 84. The higher rollers 88 are connected in common driving relationship with a hydraulic motor 92 (see FIG. 4) which is supported at one end of the conveyor frame 82 and is supplied by flexible hydraulic conduits with hydraulic fluid as received from the described hydraulic pump 56 on the one wheel truck 22 and under the control of a suitable valve (not shown). The energization of the draper conveyors 84 is such that they move simultaneously in the same direciton so that the upper conveyor flights move from left to right, as shown in FIG. 5, or, in other words, from their lower disposed end adjacent a tree T at the left in FIG. 5 to the upper discharge end at the right in FIG. 5.

Figure 6:
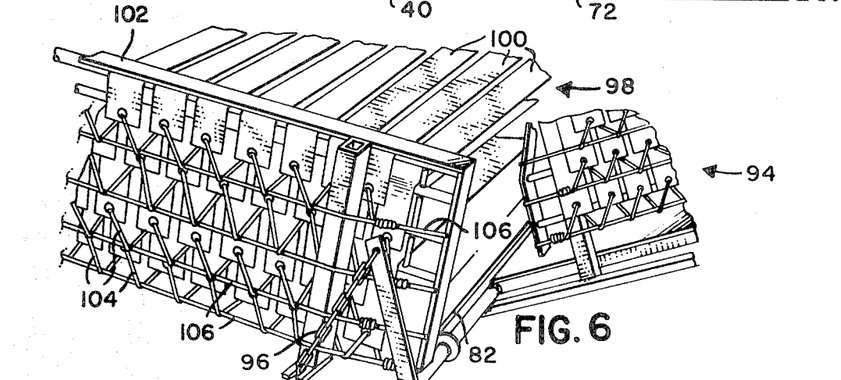
FIG. 6 is a fragmentary enlarged detail view of a portion of the ribbon fruit decelerating structure.

With continued reference to FIG. 5 and additional reference particularly to FIG. 6, a lateral wing structure 94 is secured pivotally to the lower side of the inclined draper conveyor frame 82 so as to move transversely with the draper conveyors 84 under the described actuation of the hydraulic ram 81 and, more particularly, this lateral pivoted wing is in the form of a narrow rectangular frame supporting wire mesh and a layer of resilient plastic sheeting thereover. The pivoted wing 94 can swing from an inoperative disposition whereat it is folded inwardly against the conveyor frame 82 to an outward angular disposition determined by a suitable stop chain 96 that provides a wing inclination of sufficient slope that any fruits received on the wing will roll downwardly for subsequent reception and conveyance by the draper conveyors 84. Centrally of its length, the wing 94 is broken away to support the mentioned resilient section 28 that is adapted to sealingly engage the trunk of the tree T when the unit is moved into operative harvesting disposition, as shown in FIG. 1.

Both the described wing 94 and the adjacent draper conveyors 84 are arranged to receive fruits dropped from the tree T during the harvesting operation but in order to reduce impact forces and consequent damage to the peaches or other "soft fruits," fruit-decelerating means, generally indicated at 98, are disposed over both the wing and the draper conveyors. Preferably, in accordance with a particular aspect of the present invention, this decelerating means 98 takes the form of four layers of thin elongated ribbons 100 extending transversely across the draper conveyors 84 and the wing structure 94 in spaced parallelism, the ribbons in each layer preferably being staggered relative to those of the adjacent layer. Each of the ribbons 100 is supported at longitudinal intervals by one section of a grid 102 mounted from the wing structure and the adjacent draper conveyor frame and, after passing over the grid section at the end of the wing structure or conveyor frame, the end of the ribbon is tied to a spring 104 supported under tension between the end of the ribbon and a bar 106 therebelow, as can best be visualized by reference to FIG. 6. The ribbons 100, themselves, are preferably formed from non-resilient but flexible material, such as "Saran," approximately 2.5 inches in width and spaced about 0.5 inch from one another. The spring connections enable the ribbons to give upon engagement by a fruit falling from a tree limb overhead and adjacent ribbons can also tilt to permit a decelerated passage of each fruit down to the next layer of ribbons, where the decelerating action is repeated. By the time that the individual piece of fruit has passed through the four layers, its subsequent drop onto the underlying wing structure 94 or draper conveyor 84 is slowed sufficiently so that no impact damage results. The grids 102 can be pivotally supported from the wing 94 and conveyor frame 82, so the entire decelerating means 98 can be folded flat during storage and no grid exists above the resilient tree seal section 28 so as not to interfere with the establishment of such seal.

It is to be particularly noted that although the springs 104 do create a resilience in the action of the decelerating ribbons 100, the passage of each ribbon over the supporting grid 102 at the end of the frame effects a snubbing action which dampens any resilient effects to an extent such that an individual piece of fruit is not thrown upwardly after initial engagement with the ribbons and thus is precluded from damaging impact against another peach or other fruit dropping from the tree T.

After fruits have dropped through the decelerating ribbons 100 onto the wing 94, they roll slowly down its inclined surface to be picked up by the transverse ribs 86 on the draper conveyor 84 and these fruits together with additional fruits dropping through the decelerating ribbons 100 directly onto the draper conveyors 84 are moved upwardly along the inclined path of the conveyors to the upper discharge end thereof.

Figure 4:
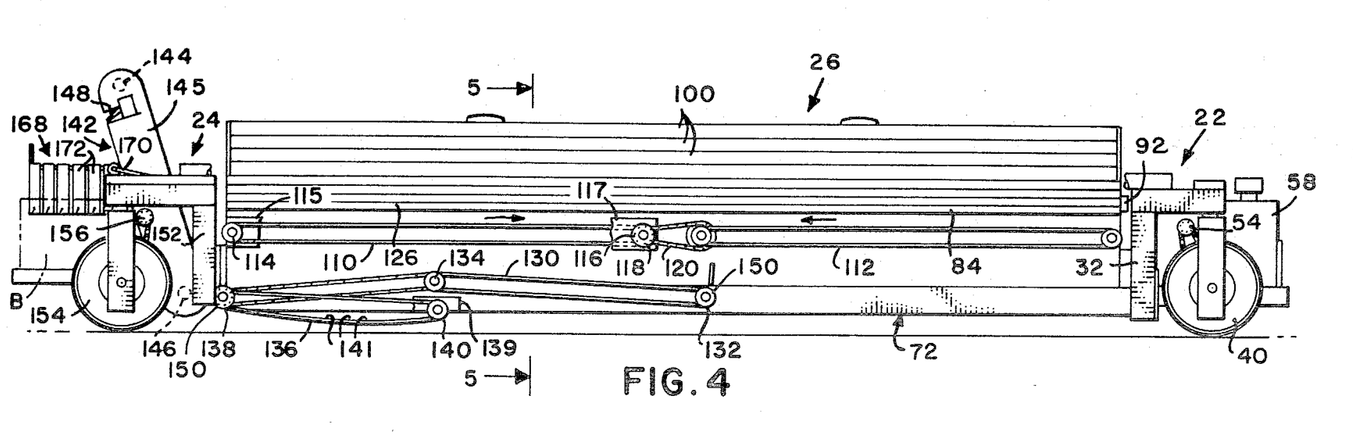
FIG. 4 is a right hand side elevational view of the harvester structure of FIG. 2 as viewed from the right thereof.

Adjacent the upper discharge end of the draper conveyors 84, a pair of horizontally-spaced and oppositely-moving conveyors 110, 112 are arranged at a lower level to receive the discharged fruits as can best be visualized by reference to FIG. 4. The conveyor 110 on the left is an endless rubber belt trained about spaced rollers 114, 116 which are supported rotatably from side walls 115, 117 carried by the main elongated frame 72 and one roller 116 is driven from a suitable hydraulic motor 118 so that the upper flight moves to the right while the other endless conveyor 112 is similarly supported and driven by a connecting sprocket chain 120 and suitable reversing sprockets (not shown) so that its upper flight moves to the left, as viewed in FIG. 4. As a consequence, all fruits received from the draper conveyors 84 are moved to a central position by the two conveyors 110, 112 and are discharged from the inner ends thereof, essentially at the center of the longitudinal frame 72.

An additional wing structure 124 is arranged to project beyond the pair of conveyors 110, 112, such structure also being in the form of a narrow elongated rectangular screen with a resilient plastic layer which slopes transversely, as shown in FIG. 5, downwardly from its outer edge at an angle so as to permit any fruits received thereon to roll slowly therefrom onto the described pair of conveyors 110, 112. Again, similar decelerating ribbons 126 are mounted in four layers over this wing structure 124 and the conveyors 110, 112 to slow the descent of the falling fruit gradually so as to preclude impact damage thereto. Grids 128 support these ribbons 126 and are formed by bars pivotally connected at their intersections so as to enable collapse into a flat disposition upon withdrawal of the draper conveyors 84 to their inoperative dispositions.

The fruits discharged centrally from the two conveyors 110, 112 are deposited upon another flexible endless belt conveyor 130 immediately thereunder, the total drop of the fruits being so slight as to obviate the necessity for any decelerating means. This conveyor 130 is mounted between the side walls 115, 117 on endless rollers 132, 134 to slope upwardly towards its discharge end at the left in FIG. 4 over the feed end of a conventional sizing conveyor 136 also in the form of a flexible belt trained about spaced rollers 138, 140 carried by side walls 139 and incorporating a plurality of openings 141 so that any fruits below a certain diameter are permitted to drop through the openings onto the ground while the adequately sized fruits are conveyed from right to left, as viewed in FIG. 4, to the lower extremity of a fruit elevator 142 which is also an endless flexible belt trained about vertically spaced rollers 144, 146 rotatably supported between side walls 145. The belt has resilient ribs 148 of sufficient size to form pockets which carry the fruits upwardly to the upper discharge end thereof.

The two conveyors 130, 136 and the elevator 142 have common drive means so as to partake of correlated motion and for this purpose a hydraulic motor 150 drives the sizing conveyor 136 and sprocket chain connections of a conventional nature are made to the conveyor 130 and the elevator 142. Both of the conveyors 130, 136 are supported from the main elongated frame but the elevator 142, on the other hand, is supported from the frame of the second wheel truck 24 which, as mentioned, is rigidly bolted to the end of the elongated frame 72, thus permitting the described drive connections between the two conveyors 130, 136 and the elevator 142.

The second wheel truck 24 is generally similar to the first wheel truck 22 including a generally rectangular frame 152 which is carried on side wheels 154 which are powered by small hydraulic motors 156 and which can be steered through a similar hydraulic ram mechanism generally indicated at 158 and of the type described in more detail in connection with the first wheel truck 22. Preferably, a driver's seat 160 is mounted on this second wheel truck 24 adjacent a control panel 162 so that the operator can control substantially all operations of the structure with the exception of the actuation of the shaker unit 30 which is preferably under the control of a second operator who is stationed at the opposite end of the harvester unit 20. The described elevator 142 is centrally mounted on the wheel truck 24 so that fruits discharged from the upper end thereof may drop into a conventional bin B or other receptacle that is supported therebelow on a pair of forks 164 which are secured at their inner ends to the wheel truck frame 152.

To further avoid any impact damage to the fruits as they drop from the discharge end of the elevator 142 into an empty bin B thereunder, an additional decelerating unit 168 of generally rectangular configuration is supported at the end of a pair of pivoted bars 170 for movement between the upper inoperative disposition whereat the bin B may be withdrawn from the described forks 164 and a lowered operative disposition within the interior of the bin, the exterior dimensions of this decelerating unit 168 being slightly less than that of the interior dimensions of the bin to allow insertion in the manner described but slightly larger than the transverse dimension of the elevator 142 so that all fruits discharged from the elevator must pass therethrough. The decelerating unit 168, again, preferably takes the form of a plurality of layers of spaced ribbons 172 which gradually slow the descent of the fruits dropped from the discharge end of the elevator 142 and thus the fruits are placed gently onto the bottom of the bin B. As the bin B fills, the decelerating unit 168 can be gradually lifted manually or preferably by another hydraulic ram (not shown) connected pivotally between the wheel truck frame 152 and the pivoted bars 170 which support the decelerating unit and under control of the machine operator who, since he is stationed immediately adjacent the bin B, can readily observe the amount of fruits therein at all times.

If the two harvester units 20, 20' have been placed in operative dispositions on opposite sides of a tree T, as illustrated in FIG. 1, with empty bins B on the supporting forks 164 at the rear of trailing end of the units, the operator on the seat 160 at the rear end of each unit will instigate operation of the conveyors 84, 110, 112, 130, 136 and elevator 142 and lower the decelerating unit 168 into the interior of each bin B so that the fruits falling thereinto will be desirably decelerated as they fall from the discharge end of the elevator 142. The operator can, if desired, instigate operation of the limb shaking unit 30 although, as mentioned, it is preferred to employ a second operator for this purpose, the first operator then being able to control the rate of conveyor and elevator motions dependent upon the rate of fruit descent onto the catcher portion 26 of each unit and also to adjust the level of the decelerating unit 168 within the bin B upwardly as the bin gradually fills with fruits.

Each shaker operator can readily establish engagement of the shaker unit 30 with different limbs of the tree to assure a full recovery of fruit and particularly because of the placement of one shaking unit 30 at the front end of the right-hand harvester unit 20, as shown in FIG. 1, and the disposition of the other shaker unit 30' at the rear end of the left-hand harvester unit 20', complete access to all limbs of the tree is enabled.

As each individual fruit is dislodged from the tree T, it drops onto one or another of the decelerating units 98, 126 which conjointly cover the entire catcher portion 26 of the harvester 20 thus to assure desired deceleration of each piece of fruit. Regardless of the precise point of engagement with the decelerating ribbons 100, each piece of fruit will be partially slowed in its descent by the first layer of ribbons since, as previously described, the spacing between ribbons is approximately 0.5 inch wherefore it is impossible for a piece of fruit to pass through the first layer of ribbons without decelerating contact. As the individual fruit contacts the ribbons 100, they will give because of the spring connection 104 at their extremities and will also tilt laterally thus to permit the fruit to pass therethrough after predetermined deceleration. The same process is repeated when the individual fruit engages the next layer of ribbons 100 and its descent is further slowed thereby. This repetitive process continues until the individual fruit is substantially stopped in its descent at the fourth and lowermost layer of ribbons so that its final drop therefrom onto the underlying draper conveyor 84 or wings 94, 124 constitutes merely a slight movement of the individual piece of fruit from the rest position on the lowest layer of ribbons onto the conveyor or wing structure thereunder, a total drop of no more than three inches. Since the draper conveyors 84 are formed of canvas and the wing structures 94, 124 are provided with resilient plastic layers, even the small drop is cushioned and no damage whatsoever is experienced by the slight impact resultant from such small drop.

Obviously, the fruits which drop onto the draper conveyors 84 are moved upwardly to the discharge end thereof and these fruits are joined by those initially deposited on the wing structure 94 adjacent the tree T whose slope is such that a fruit dropped thereonto will roll quite slowly to the lower entrance end of the draper conveyors 84 to be thereafter picked up by the resilient ribs 86 and moved thereafter towards the discharge end of the particular draper conveyor. It is to be particularly observed that if a peach, for example, has moved from the wing structure 94 onto the lower end of one draper conveyor 84 and is being moved upwardly thereby, if another peach, by any chance, drops from the layer of ribbons 100 over that draper conveyor directly onto the peach already resting on the draper conveyor, minimum impact between the peaches is encountered and the second peach merely rolls from the top of a peach thereunder onto the adjacent section of canvas. Thus, no damaging impact between peaches or other fruits is encountered.

As the fruits are discharged from the upper discharge ends of the draper conveyors 84, they drop through the additional decelerating ribbons 126 onto one or the other of the two longitudinally-extending conveyors 110, 112 and because of such decelerating structure and the relatively soft flexible rubber material from which these conveyors are formed, no impact damage occurs during this transfer. In turn, any fruits dropping onto the area of the wing structure 124 on the remote side of these longitudinal conveyors 110, 112 is decelerated in a similar fashion and thereafter rolls very slowly across the underlying wing structure onto the opposite side of the longitudinally extending conveyors 110, 112 to join the fruits deposited thereon from the draper conveyors 84.

Thereafter, all fruits are delivered from the two longitudinally extending conveyors 110, 112 through the central opening at their discharge ends for a very short descent onto the additional transfer conveyor 130 thereunder. The relative rates of the conveyors 110, 112, 130 can be adjusted by the operator so that the fruits are removed faster by the underlying conveyor 130 than they are delivered by the two conveyors 110, 112 to the central opening, thus to avoid dropping of one fruit onto another during this transfer step. All of the fruits are then delivered to the sizing conveyor 136 which operates in a conventional fashion to permit undersized fruits to be discharged through the openings 141 therein while the remaining fruits are gently moved to the entrance end of the elevator 142. At this point, the fruits are gently picked up by the ribs 148 which form pockets in the elevator 142 and are moved upwardly and over the discharge end of the elevator to thereupon drop through the additional decelerating unit 168 within the interior of the bin B to be softly deposited initially on the floor of the bin and later onto other fruits therebelow, the operator gradually raising the decelerating unit 168 as the bin fills.

As soon as all fruits have been dislodged from a particular tree T, the operator can immediately instigate lateral motion of the draper conveyor frame 82 and the tree-engaging wing structure 94 through operation of the hydraulic ram 81 and as soon as the tree-engaging contact has been released, the operator can instigate actuation of the hydraulic drive motors 54, 156 to all four wheels 40, 154 to move the particular harvester unit 20 forwardly towards a position adjacent the next tree in the row of fruit trees. During such movement, the conveyors 84, 110, 112, 130, 136 and the elevator 142 can continue to operate and to effect filling of the bin during the forward travel, thus expediting the entire harvesting operation.

Since normally the trees in an orchard are arranged in rectilinear rows, substantially no steering is required by the operator and he need merely stop forward motion of the harvester unit 20 when it lies centrally opposite the next tree in the row and can thereupon instigate the lateral motion of the draper conveyor frame 82 to bring the central resilient tree seal section 28 of the wing 94 into sealing engagement with the trunk of this next tree. It will be observed that since the entire draper conveyor frame 82 is supported or cradled between the higher wheel trucks 22, 24 and is moved along a downwardly inclined path toward an adjacent tree, the tree can be engaged at a very low position and no limbs on the tree will interfere with the establishment of harvesting contact. Obviously, after both harvester units 20, 20' have been brought into operative dispositions adjacent this subsequent tree, the harvesting process, as described hereinabove, will be repeated.

When the end of a row of trees is reached, each harvester unit 20, 20' can be readily turned and maneuvered quickly into position for longitudinal motion along the next row of trees, the steering arrangement on the wheel trucks 22, 24 at both ends of the unit facilitating such quick and easy maneuverability, thus further to render the operation one of maximum harvesting rate while retaining minimum damage to the harvested fruits.

Figure 7:
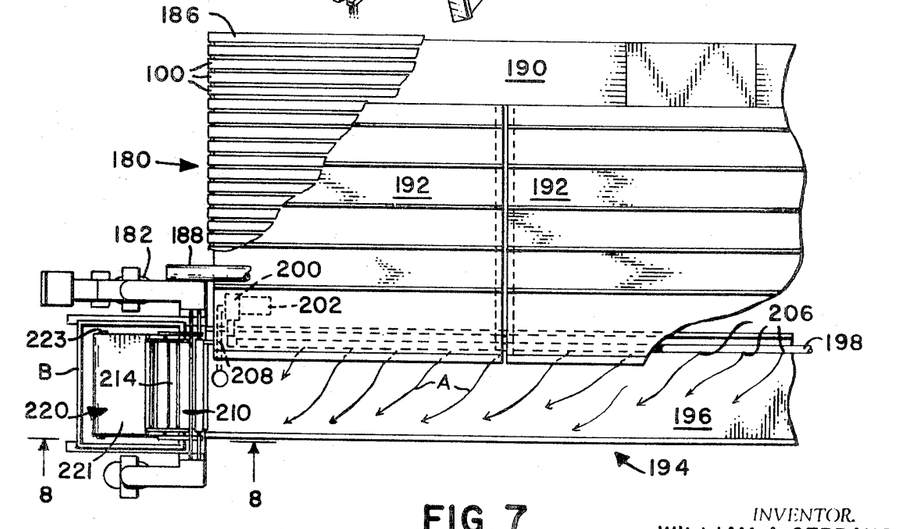
FIG. 7 is a partial fragmentary top plan view of a harvester unit constituting a slightly modified embodiment of the structure shown in FIGS. 1 through 6.
Figure 8:
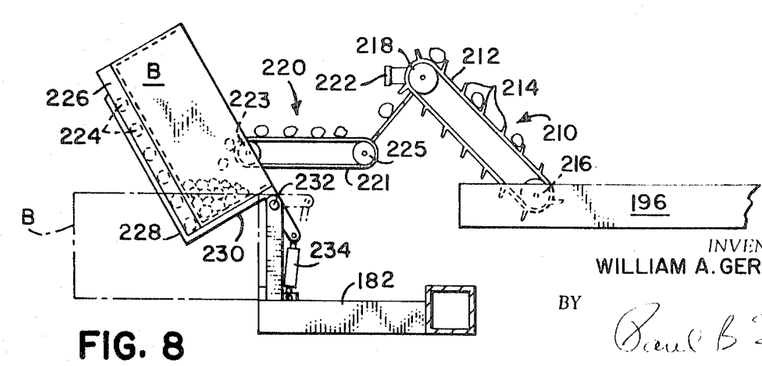
FIG. 8 is a fragmentary side elevational view of a portion of the bin loading arrangement of the FIG. 7 structure.

It will be quite apparent that many modifications and additions can be made to the described first embodiment of the invention without departing from the general inventive concept and one slightly modified embodiment is illustrated in FIGS. 7 and 8 to which specific reference is now made. As specifically shown in FIG. 7 in an overall plan view, a modified harvester unit 180 includes a pair of independently driven and steerable wheel trucks 182 only one of which is shown mounting a catcher portion 186 at a low level therebetween in the same general fashion as described in detail relative to the first embodiment of the invention. A limb-shaking mechanism 188 is mounted from the one wheel truck 182 of the unit which appears to the left in FIG. 7 and is operative, as previously described in connection with the first embodiment of the invention, to dislodge fruits from the tree for reception by the catcher portion 186 of the unit including a tree-engaging wing structure 190 and a number of inclined draper conveyors 192 which can be identical to those previously described.

However, in accordance with the modified aspect of the invention in this second embodiment, the draper conveyors 192 discharge the fruits at their upper extremities into a water conveyor 194 which takes the form of a rather shallow elongated trough 196 that is mounted under the discharge ends of the draper conveyors so that the fruits discharged from the latter will fall downwardly into the trough. Water is maintained in the trough 196 at a level of approximately 6 inches in depth so as to cushion the fall of fruits into the trough and such cushioning effect is normally sufficient to avoid any impact damage whatsoever. However, although not illustrated, an additional ribbon decelerating unit can be placed over the top of the trough 196 corresponding to that disposed over the endless belt conveyors 110, 112 described in connection with the first embodiment of the invention.

In order to effect conveyance of the fruits dropped into the water trough 196, movement is imparted to the water longitudinally of the trough towards the discharge end thereof at the left in FIG. 7 and also in a transverse direction away from the discharge ends of the draper conveyors 192 so that an individual fruit dropping into the trough is immediately moved toward the remote side thereof and impact with a successively falling piece of fruit is thus effectively precluded. For this purpose, an elongated manifold 198 is disposed along the interior side of the trough 196 in proximity to the discharge ends of the draper conveyors 192 and water is delivered to this manifold by a suitable pump 200 energized by a hydraulic motor 202 which is, in turn, activated by suitable hydraulic connection to the main hydraulic pump (not shown) corresponding to the main pump 56 in the first embodiment of the invention and is discharged through a plurality of nozzles 206 angularly toward the remote outer side of the trough 196 and also in the direction of its discharge end. Accordingly, the flow of water within the trough is substantially as shown by the arrows A in FIG. 7. A return water line 208 is connected to the bottom of the trough adjacent its discharge end and returns the water to the suction side of the pump 200.

At the discharge end of the water conveyor 194, the lower extremity of an elevator 210 is arranged to pick up the fruits and subsequently deliver the same to a sorting conveyor 220 and thence into a bin B. The elevator 210 can be of the same general type described in connection with the first embodiment of the invention including an endless flexible belt 212 having resilient ribs 214 projecting from its outer surface and trained about two rollers 216, 218, at lower and upper positions so that the fruits withdrawn from the trough 196 are subsequently discharged at an upper level onto the mentioned sorting conveyor 220, which quite simply takes the form of an endless belt 221 trained about horizontally-spaced rollers 223, 225 disposed at a level beneath the upper discharge end of the elevator 210 so as to receive fruits discharged therefrom. Both the elevator 210 and the sorting conveyor 220 are driven by a suitable hydraulic motor 222 and the speed can be adjusted to vary the rate of conveyance in accordance with the overall rate of fruit harvesting.

The bin B is supported upon a plurality of rollers 224 on the normally horizontal frame portion 226 of a pivoted bin carrier 228, as illustrated in phantom lines in FIG. 8, the bin carrier also including a vertical frame portion 230 which is pivotally secured to a substantially horizontal shaft 232 at its upper extremity which is supported from the wheel truck 182 immediately under the discharge end of the sorting conveyor 220. A double-acting hydraulic ram 234 is secured between the vertical frame portion 230 of the bin carrier 228 and the adjacent frame of the wheel truck 182 for extension or retraction. When the hydraulic ram 234 is retracted the entire bin carrier 228 and a bin B supported thereon is moved upwardly about the pivot shaft 232 through an angle of approximately 90 degrees, as shown in full lines, wherefore one side of the bin B lies immediately under the horizontal discharge section of the sorting conveyor 220 and fruits discharged from the latter have but a slight drop onto the adjacent side of the bin B. As the filling operation continues, the bin B is gradually lowered by downward pivotal motion of the bin carrier 228 until it obtains its normal upright disposition as the filling of the bin is completed. The filling of the bin can be very rapid and yet no impact damage to the fruit is encountered during the operation.

Figure 9:
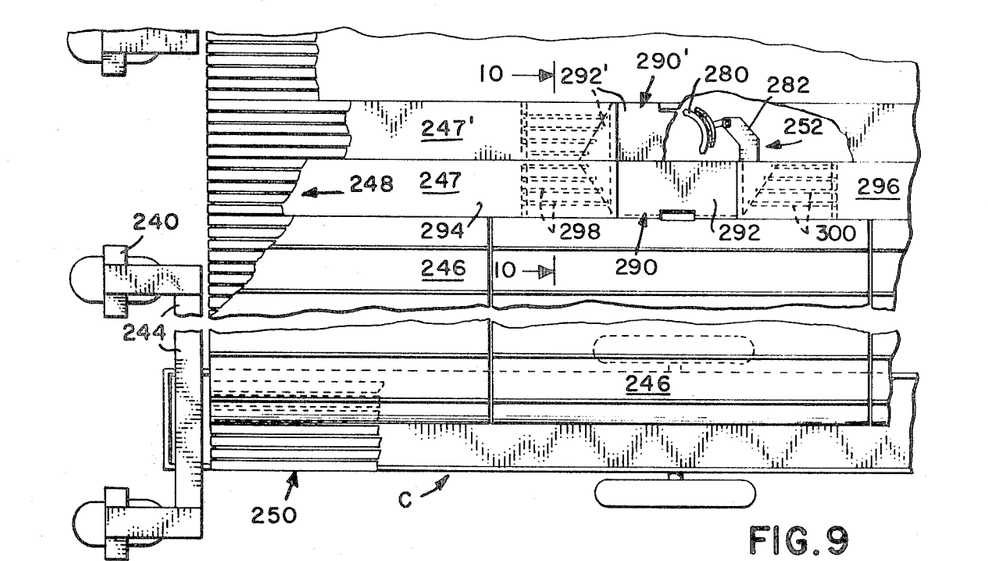
FIG. 9 is a fragmentary top plan view similar to FIG. 1 of yet a third embodiment of the invention illustrating the cooperative arrangement of a harvester arranged to discharge the fruits into a separate cart or gondola.
Figure 10:
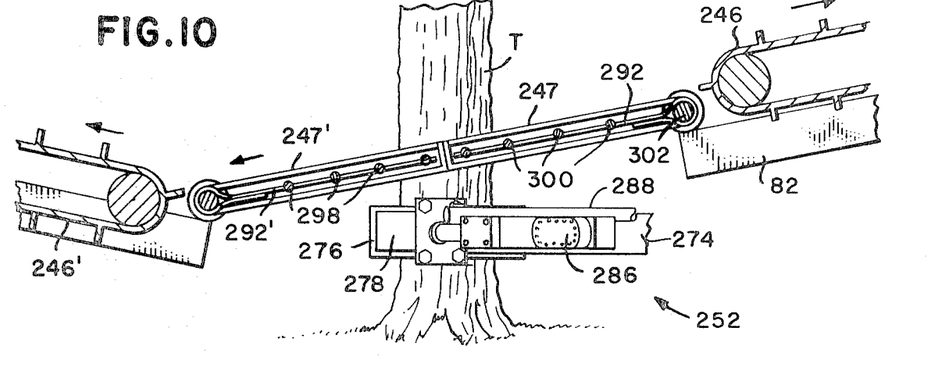
FIG. 10 is an enlarged fragmentary central sectional view taken along line 10—10 of FIG. 9.
Figure 11:
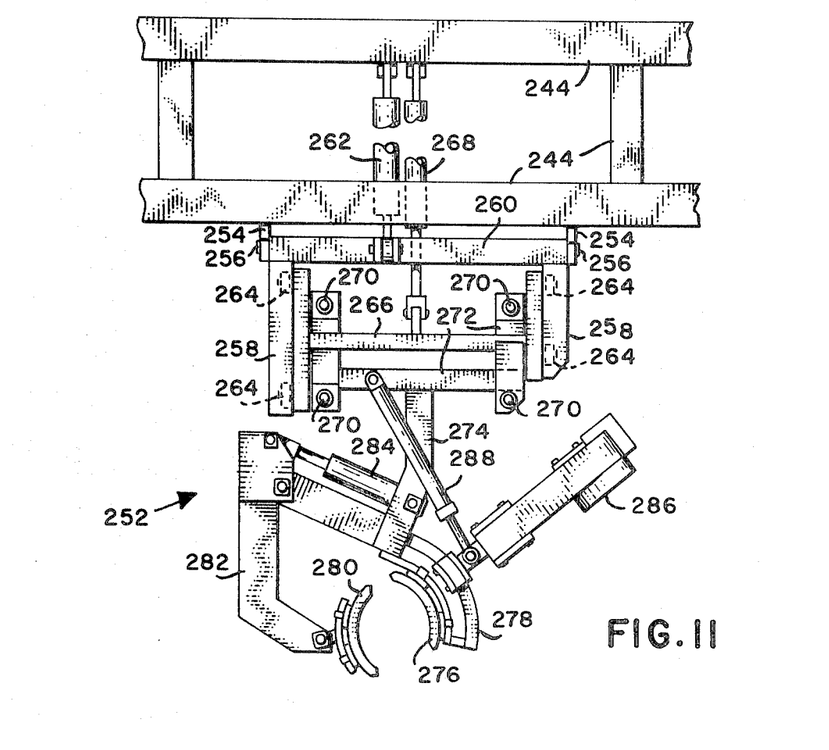
FIG. 11 is an enlarged plan view of the trunk shaker mechanism included in the FIG. 9 structure and, FIG. 12 is a side elevational view similar to FIG. 4 of a further modified bin conveyor arrangement.

Certain additional modifications can be made depending upon the type of tree and fruit which is to be harvested although the same basic principle of avoiding damage to the fruit during the harvesting operation is maintained. As an example, in certain cases fruits can be dislodged from a tree through vibration of its trunk rather than the individual limbs and a modified version adapted for this particular operation is shown in FIGS. 9, 10, and 11 to which reference is specifically made in relation to the following description of this modified embodiment of the invention.

With initial reference to FIG. 9, a pair of wheel trucks 240, one of which is shown, suspend therebetween an elongated frame 244 which in turn carries an inclined draper conveyor 246 and associated wing 247 for transverse inclined movement to and from contact with an adjacent tree trunk generally in the fashion described in connection with the first embodiment of the invention. More particularly the wheel truck 240 is slightly modified in that the vertical and horizontal frame member is extended dimensionally so that an arched frame is provided at the wheel truck of sufficient horizontal and vertical dimensions so that an elongated gondola or cart C can pass under the arched wheel truck units and below the upper discharge end of the inclined draper conveyor 246 wherefore fruits delivered from such conveyor can drop directly into the open cart thereunder. The cart C normally includes an elongated receptacle supported at a rather low elevation by a pair of wheels and is pulled by a suitable tractor (not shown) although various forms of self-propelled vehicles having a relatively low contour can be used as alternatives. The overall length of the cart C is sufficient so that the receptacle is capable of receiving fruits discharged from any portion of the draper conveyor 246.

Fruit decelerating means 248 in the form of spaced parallel ribbons such as described in conjunction with the first embodiment of the invention are placed over the draper conveyor 246 and an additional decelerating means 250 can be positioned below the discharge end of the draper conveyor to slow the fall of fruits into the cart C so that fruit damage is once again minimized as has been discussed in detail with regard to the other embodiments of the invention.

While the draper conveyor 246 and associated wing 247 are suspended between the wheel trucks 240 at the opposite ends thereof in a fashion similar to that described in conjunction with the first embodiment of the invention, such draper conveyor or conveyors can be elongated in their direction of travel to assure engagement at one edge with a tree trunk at a rather low level but to also assure sufficient height at its discharge end to enable deposit of the fruits into the receiving cart C. The increased width of the wheel truck 240 readily enables such increased dimensions of the draper conveyor 246 in the direction of fruit movement. Furthermore, the wing 247 is inclined downwardly toward the tree trunk T and in coplanar relation with the adjacent wing 247' on the opposite harvester unit, as best shown in FIG. 10, to enable accommodation of a modified form of tree shaking mechanism now to be described. The tree shaking mechanism, rather than being in the form of a limb-engaging shaker as described in the previous embodiment of the invention, takes the form of a trunk-engaging shaking mechanism 252 which is best illustrated in FIG. 11. As there shown, a pair of brackets 254 are secured to the elongated frame 244 underneath the draper conveyor 246 to carry an elongated substantially horizontal pivot pin 256 about which a pair of laterally projecting tracks 258 are pivotally supported at their inner ends. The two tracks 258 are joined by a transverse brace 260 and in turn this transverse brace is connected pivotally to one end of a hydraulic ram 262 whose opposite extremity is pivotally connected to the elongated frame 244 wherefore extension or retraction of the ram effects a pivotal motion of the tracks and a consequent raising or lowering of their outer extremities.

The described tracks 258 accommodate rollers 264 on opposite sides of a generally flat, open rectangular frame 266 which can be moved inwardly or outwardly along the tracks through appropriate actuation of a double-acting hydraulic ram 268 connected pivotally between the flat rectangular frame and the main elongated frame 244 of the unit thus to effect a generally horizontal transverse motion of the roller-supported frame 266. This flat, rectangular frame 266, in turn, carries at its corners through suitable resilient universal mountings four suspension rods 270 which suspend through similar universal mountings at their lower extremities a secondary frame 272 of generally flat, rectangular nature from which a rather heavy rectangular rod 274 projects outwardly beyond the lower end of the draper conveyor 246 to support at its outer extremity a tree-engaging clamp including one fixed tree engaging member 276 including a tree engaging cushion supported in spaced relationship from an arcuate supporting rod 278 and a second movable tree engaging member 280 supported at the extremity of a rod 282 pivoted about substantially a vertical axis from the supported end of the first fixed tree engaging member 276. Clamping action against the trunk of the tree is intigated or released by appropriate hydraulic actuation of a double-acting hydraulic ram 284 positioned between the fixed and movable clamping members 276, 280 under the control of the machine operator.

An inertia shaking mechanism 286 is tied at its one end to the arcuate supporting rod 278 for the fixed tree clamping member 276 and is capable of movement along such arcuate rod to different angular positions relative to the clamping member and accordingly relative to a tree trunk engaged thereby. The entire inertia shaking unit 286 is shifted in its angular position through utilization of another double-acting hydraulic ram 288 pivotally secured at its one end to the inertia shaking unit and at its remote extremity to the suspended rectangular support frame 272. If, through actuation of this hydraulic ram 288, the disposition of the inertia shaking unit 286 is changed, its substantially rectilinear shaking force is delivered to the clamping member 276 and to the trunk of the tree at a different angle and it has been found in practice that such angular variation of the applied shaking forces assures complete dislodging of all ripened fruits from the tree.

It will be obvious that the entire trunk shaking mechanism 252 can be withdrawn horizontally and lifted vertically when the draper conveyor 246 in turn is withdrawn in the fashion described in detail with regard to the first embodiment of the invention so that the entire harvester unit can be moved from one tree to the next. In turn, when a position has been attained opopsite a subsequent tree whose fruit is to be harvested, the pivoted tracks 258 are lowered and the trunk shaking mechanism 252 extended to bring the tree clamping members 276, 280 into positions on opposite sides of the tree. At this point the operator actuates the clamping ram 284 to establish firm clamping engagement with the trunk of the tree at a desired low level and the draper conveyor 246 is then extended into tree engaging relationship. At this time, the inertia shaking mechanism 286 can be hydraulically energized and moved gradually to various angular dispositions to effect shaking of the entire tree and consequent dislodging of the ripened fruits thereupon which, in turn, fall onto the draper conveyor 246 through the decelerating ribbons 248 for subsequent conveyance into the receiving cart C. The harvesting operation is rapid and because of the incorporated decelerating means 248, 250 assures that the harvested fruits are not injured and a recovery of undamaged fruits in excess of 95% is ultimately attained.

It is, of course, obvious that the entire tree T will be shaken by engagement of its trunk with the single illustrated trunk shaking mechanism 252 and as a consequence, the need for any form of shaking mechaisnm on the opposite harvester unit in FIG. 9 is eliminated. Furthermore, since this single trunk shaking mechanism 252 is located under the draper conveyors 246 and wing structure 247, as most clearly appears in FIG. 10, no interference with peaches or other fruits falling onto the conveyors or wings is experienced.

As previously mentioned, the wing structure 247 on the harvester unit which supoprts the single trunk shaking mechanism 252 is preferably inclined downwardly towards the tree trunk T thus to enable full accommodation of the trunk shaking mechanism 252 thereunder. When the two harvester units are brought into opopsed relationship on opposite sides of the tree T, this downwardly inclined wing structure 247 is arranged to project in co-planar relationship with the opposite wing structure 247' whose angular arrangement is similar to that shown in the first embodiment in the invention so that fruits may roll thereover onto the adjacent draper conveyors 246'. Accordingly, in this arrangement, fruits dropping onto both wing structures 247 and 247' are delivered to the draper conveyors 246'.

Both of the wing structures 247, 247' are pivotally mounted from the draper conveyor frame much in fashion described in connection with the first embodiment of the invention and in fact can be structurally identical with those of the first embodiment of the invention and one merely modified in its pivotal-disposition to provide the described co-planar relationship. However, as illustrated in FIGS. 9 and 10, the central tree seal section 290, 290' on each wing structure 247, 247' is formed in a slightly modified fashion which assures the absence of any folds resultant from sealing engagement with the trunk of the tree T. More particularly, each tree seal section 290 takes the form of a trapezoidal section 292 of canvas or other flexible fabric whose angular extremities are joined to the padded wing sections 294, 296 on either side thereof, by resilient cords 298, 300 which are placed under tension to maintain a substantially flat disposition of the canvas even when a tree trunk is engaged thereby. The outer edge of the canvas section 292 is, of course, unsupported so that it may yield when a tree trunk is engaged thereby and the inner edge is in turn supported suitably on a pipe 302 or other structure constituting an integral part of the inner edge of the entire wing structure 247. The absence of any folds on either tree seal section 247, 247' of the two harvester units assures that fruits falling on the tree seal section can roll freely thereover onto the draper conveyor 246' of the one harvester unit.

A further slightly modified embodiment of the invention may otherwise be structurally similar to the previously described third embodiment of the invention wherein the fruit is deposited into a cart C enables delivery of the fruits successively into standard fruit-receiving bins B whose use rather than the elongated cart C may be preferred by certain operators.

Figure 12:
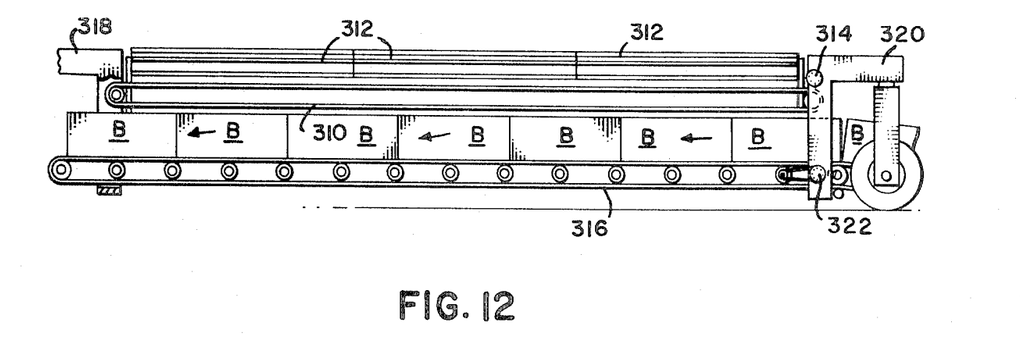

As clearly shown in FIG. 12, an elongated endless belt conveyor 310 is mounted to extend longitudinally of the harvester unit at a level and disposition immediately below the discharge end of the draper conveyors 312 so that harvested fruits will be moved towards the left hand end of such belt conveyor by appropriate hydraulic actuation of a simple hydraulic motor 314. A second endless belt conveyor 316 is supported for movement in the same direction at a much lower level and immedaitely under the fruit conveyor 310 so as to be capable of conveying in successive abutting relationship a series of standard fruit receiving bins B, the tops of the bins lying immediately below the fruit conveyor 310, as illustrated. The bin conveyor 316 is somewhat longer than the fruit conveyor and extends beneath the supporting wheel trucks 318, 320 at opposite ends of the harvester unit which wheel trucks are of rather high arched configuration to allow the passage of the bins B thereunder much in the fashion that the cart C could move under the arched frame elements of the wheel trucks in the previously described third embodiment of the invention. Empty bins B can be loaded onto the right-hand end of the bin conveyor 316 in successive abutting relationship and a conveyor motor 322 can be actuated intermittently by a suitable hydraulic control valve (not shown) to bring each bin B successively into a disposition underlying the left-hand discharge end of the fruit conveyor 310. When a bin B in such receiving position has been filled by the discharge of fruits thereinto, the bin conveyor 316 is again actuated to bring the successive bin B in the series into such fruit-receiving or loading position and, in turn, the loaded bins are delivered to the discharge and of the bin conveyor 316 for reception by a suitable bin carrier of standard design (not shown).

As will be obvious, a decelerating unit (not shown) such as the one described in connection with the first embodiment of the invention can be inserted into each bin B when in its loading or fruit-receiving position and the harvester unit shown in FIG. 12 can utilize any of the alternate arrangements described in connection with the previous embodiments of the invention. For example, the unit can be designed to operate with limb shaking mechanisms of the type described in connection with the first embodiment of the invention or, alternatively, with a trunk shaking mechanism as described in conjunction with the third embodiment of the invention. In other words, for various harvesting operations, various combinations of the described elements can be utilized as preferred for that particular harvesting operation.

What is claimed is:

1. A harvester unit which comprises,
a pair of wheel trucks at longitudinally spaced positions,
a fruit-catching portion supported at its opposite extremities by said wheel trucks at a level immediately above the ground,
said fruit-catching portion including an elongated frame connected to said wheel trucks at its opposite extremities,
a draper conveyor supported on said frame to receive and conduct fruits transversely relative to the elongated frame,
said draper conveyor being inclined upwardly in its direction of fruit-conducting motion, and being supported on said elongated frame for movement as a unit along an inclined path transversely of said frame,
said fruit-catching portion including a wing structure supported adjacent the lower end of said inclined draper conveyor and movable therewith as a unit on said elongated frame.

2. A harvester unit according to claim 1 wherein said wing structure includes a resilient edge section adapted to establish sealing engagement with the trunk of a tree at its base.

3. A harvester unit according to claim 1 wherein said wing structure is supported pivotally for movement to an upward angle of inclination from said draper conveyor, said angle being such that fruits roll slowly thereacross onto said draper conveyor.

4. A harvester unit which comprises,
a pair of wheel trucks at longitudinally spaced positions,
a fruit-catching portion supported at its opposite extremities by said wheel trucks at a level immediately above the ground,
said fruit-catching portion including an elongated frame connected to said wheel trucks at its opposite extremities,
a draper conveyor supported on said frame to receive and conduct fruits transversely relative to the elongated frame,
said fruit-catching portion including fruit-decelerating means super-imposed over all of said draper conveyor,
said fruit-decelerating means including a plurality of layers of parallel slightly-spaced ribbons,
said ribbons being flexible but non-resilient and connected at their extremities to resilient members.

5. A harvester unit according to claim 4 wherein each of said ribbons is frictionally engaged adjacent its extremity to snub or dampen its resilient motion.

6. A harvester unit which comprises,
a pair of wheel trucks at longitudinally spaced positions,
a fruit-catching portion supported at its opposite extremities by said wheel trucks at a level immediately above the ground,
said fruit-catching portion including an elongated frame connected to said wheel trucks at its opposite extremities,
a draper conveyor supported on said frame to receive and conduct fruits transversely relative to the elongated frame,
conveying means mounted on said elongated frame under the discharge end of said draper conveyor to receive and conduct fruits longitudinally of said frame to the second of said wheel trucks,
an elevator supported on said second wheel truck to receive fruits from said conveying means, and a bin support on said wheel truck adapted to support a bin in an upright position below the discharge end of said elevator.

7. A harvester unit according to claim 6 wherein said conveying means includes a pair of oppositely-moving conveyors below said draper conveyor on said frame arranged to discharge fruits substantially centrally of said frame and a transfer conveyor supported below one of said oppositely-moving conveyors for receiving fruits and conducting them to said elevator.

8. A harvester unit according to claim 7 wherein said transfer conveyor includes a fruit sizing portion.

9. A harvester unit according to claim 6 wherein said bin support is mounted for pivotal motion about a substantially horizontal axis through approximately 90 degrees to bring the side of a supported bin into a position closely adjacent the discharge end of said elevator.

10. A harvester unit according to claim 6 which comprises a fruit-decelerating unit pivotally supported on said second wheel truck for movement downwardly into a bin on said bin support.

11. A harvester unit according to claim 6 wherein said conveying means includes a water trough supported below the discharge end of said draper conveyor, and means for moving the water in said trough transversely thereof away from said draper conveyor and longitudinally thereof toward said elevator.

12. A harvester unit which comprises, a pair of wheel trucks at longitudinally spaced positions, a fruit-catching portion supported at its opposite extremities by said wheel trucks at a level immediately above the ground, said fruit-catching portion including an elongated frame connected to said wheel trucks at its opposite extremities, a draper conveyor supported on said frame to receive and conduct fruits transversely relative to the elongated frame, a fruit conveyor supported under the discharge end of said draper conveyor, and a bin conveyor supported below said fruit conveyor and arranged to convey bins successively to a position under the discharge end of said fruit conveyor.

13. A harvester unit according to claim 12 which comprises intermittent drive means for said bin conveyor.

14. Decelerating apparatus for falling fruits or the like which comprises, a layer of parallel slightly spaced flexible members, means resiliently supporting each of said members at its extremity, means engaging each of said members frictionally to dampen its resilient motion.

15. Decelerating apparatus according to claim 14 which comprises, a plurality of layers of said resiliently supported slightly-spaced members, each layer having the members in staggered relation to the adjacent layers.

References Cited

UNITED STATES PATENTS

| | | | |
|---|---|---|---|
| 1,626,068 | 9/1927 | Bartlett | 56—328 |
| 2,468,313 | 4/1949 | Turner | 56—25 |
| 2,750,726 | 6/1956 | Boucard et al. | 56—25 |
| 3,105,346 | 10/1963 | Stanclift | 56—329 |
| 3,347,032 | 10/1967 | Pool et al. | 56—329 |
| 3,407,582 | 10/1968 | Poehlmann | 56—329 |
| 3,477,215 | 11/1969 | Herbst | 56—328 |
| 3,522,696 | 8/1970 | Millier et al. | 56—328 |
| 2,692,470 | 10/1954 | Boman | 56—328 |
| 2,714,281 | 8/1955 | Steele | 56—329 |
| 3,218,790 | 11/1965 | Edgemond, Jr. | 56—329 |
| 3,362,145 | 1/1968 | Steingas et al. | 56—328 |
| 3,460,329 | 8/1969 | Overstreet, Jr. | 56—328 |
| 3,474,609 | 10/1969 | Alberti et al. | 56—329 |

RUSSELL R. KINSEY, Primary Examiner